(12) United States Patent
Poo (10) Patent No.: US 7,650,470 B2
(45) Date of Patent: Jan. 19, 2010

(54) METHOD AND DEVICES FOR DATA TRANSFER

(75) Inventor: Teng Pin Poo, Singapore (SG)

(73) Assignee: Trek 2000 International, Ltd., Singapore (SG)

( * ) Notice: Subject to any disclaimer, the term of this patent is extended or adjusted under 35 U.S.C. 154(b) by 21 days.

(21) Appl. No.: 10/481,993

(22) PCT Filed: Jun. 28, 2001

(86) PCT No.: PCT/SG01/00136

§ 371 (c)(1), (2), (4) Date: Jun. 14, 2004

(87) PCT Pub. No.: WO03/003141

PCT Pub. Date: Jan. 9, 2003

(65) Prior Publication Data

US 2004/0225762 A1    Nov. 11, 2004

(51) Int. Cl.
*G06F 13/00* (2006.01)
*G06F 3/00* (2006.01)

(52) U.S. Cl. .................... 711/154; 711/100; 711/200
(58) Field of Classification Search ............. 711/100, 711/154, 200; 455/426.2; 710/36, 44
See application file for complete search history.

(56) References Cited

U.S. PATENT DOCUMENTS

| | | | |
|---|---|---|---|
| 4,853,523 A | 8/1989 | Talmadge | |
| 4,946,276 A | 8/1990 | Chilcott | |
| 4,988,855 A | 1/1991 | Iijima | |
| 5,282,247 A | 1/1994 | McLean et al. | |
| 5,291,584 A | 3/1994 | Challa et al. | |
| 5,297,148 A | 3/1994 | Harari et al. | |
| 5,375,243 A | 12/1994 | Parzych et al. | |
| 5,414,425 A | 5/1995 | Whiting et al. | |
| 5,442,704 A | 8/1995 | Hotey | |
| 5,469,564 A | 11/1995 | Junya | |
| 5,485,519 A | 1/1996 | Weiss | |
| 5,490,096 A | 2/1996 | Seto | |
| 5,517,014 A | 5/1996 | Iijima | |
| 5,583,538 A | 12/1996 | Watanabe et al. | |
| 5,588,146 A | 12/1996 | Leroux | |

(Continued)

FOREIGN PATENT DOCUMENTS

CA    2334113    4/1999

(Continued)

OTHER PUBLICATIONS

Aladdin eToken and Rainbow iKey; Rainbow; date unknown.

(Continued)

*Primary Examiner*—Tuan Van Thai
(74) *Attorney, Agent, or Firm*—White & Case LLP (57) ABSTRACT

A storage apparatus is proposed for facilitating wireless communication between a computer device and one or more external portable electronic devices, or between those external devices. The storage apparatus includes a wireless transceiver for entering communication with any of one the devices. When the storage apparatus is communicating with any of the devices, it can transmit to that device any data stored in its memory for transmission to that device. Furthermore, the storage apparatus can receive from that device, and transmit to its memory, data to be relayed to another of the devices.

19 Claims, 5 Drawing Sheets

U.S. PATENT DOCUMENTS

| | | | |
|---|---|---|---|
| 5,621,798 | A | 4/1997 | Aucsmith |
| 5,623,552 | A | 4/1997 | Lane |
| 5,646,646 | A | 7/1997 | Inoue et al. |
| 5,655,077 | A | 8/1997 | Jones et al. |
| 5,659,705 | A | 8/1997 | McNutt et al. |
| 5,663,901 | A | 9/1997 | Wallace et al. |
| 5,684,742 | A | 11/1997 | Bublitz et al. |
| 5,760,986 | A | 6/1998 | Morehouse et al. |
| 5,815,201 | A | 9/1998 | Hashimoto et al. |
| 5,815,252 | A | 9/1998 | Price-Francis |
| 5,815,426 | A | 9/1998 | Jigour et al. |
| 5,844,986 | A | 12/1998 | Davis |
| 5,850,189 | A | 12/1998 | Sakanaka et al. |
| 5,867,802 | A | 2/1999 | Borza |
| 5,890,016 | A | 3/1999 | Tso |
| 5,920,640 | A | 7/1999 | Salatino et al. |
| 5,928,347 | A | 7/1999 | Jones |
| 5,931,791 | A | 8/1999 | Saltzstein et al. |
| 5,935,244 | A | 8/1999 | Swamy et al. |
| 5,938,750 | A | 8/1999 | Shaberman |
| 5,943,603 | A | 8/1999 | Parulski et al. |
| 5,949,882 | A | 9/1999 | Angelo |
| 5,956,415 | A | 9/1999 | McCalley et al. |
| 5,969,750 | A | 10/1999 | Hsieh et al. |
| 5,978,833 | A | 11/1999 | Pashley et al. |
| 6,003,135 | A | 12/1999 | Bialick et al. |
| 6,005,613 | A | 12/1999 | Endsley et al. |
| 6,011,486 | A | 1/2000 | Casey |
| 6,011,741 | A | 1/2000 | Wallace et al. |
| 6,012,103 | A | 1/2000 | Sartore et al. |
| 6,016,476 | A | 1/2000 | Maes et al. |
| 6,016,530 | A | 1/2000 | Auclair et al. |
| 6,016,553 | A | 1/2000 | Schneider et al. |
| 6,027,375 | A | 2/2000 | Wu |
| 6,034,621 | A | 3/2000 | Kaufman |
| 6,038,320 | A | 3/2000 | Miller |
| 6,038,640 | A | 3/2000 | Terme |
| 6,044,428 | A | 3/2000 | Rayabhari |
| 6,047,376 | A | 4/2000 | Hosoe et al. |
| 6,058,441 | A | 5/2000 | Shu |
| 6,061,799 | A | 5/2000 | Eldridge et al. |
| 6,067,625 | A | 5/2000 | Ryu |
| 6,087,955 | A | 7/2000 | Gray |
| 6,088,755 | A | 7/2000 | Kobayashi et al. |
| 6,088,802 | A | 7/2000 | Bialick et al. |
| 6,105,130 | A | 8/2000 | Wu et al. |
| 6,116,006 | A | 9/2000 | Killen et al. |
| 6,125,192 | A | 9/2000 | Bjorn et al. |
| 6,131,141 | A | 10/2000 | Ravid |
| 6,145,045 | A | 11/2000 | Falik et al. |
| 6,145,046 | A | 11/2000 | Jones |
| 6,145,069 | A | 11/2000 | Dye |
| 6,148,354 | A | 11/2000 | Ban et al. |
| 6,151,069 | A | 11/2000 | Dunton et al. |
| 6,151,657 | A | 11/2000 | Sun et al. |
| 6,178,508 | B1 | 1/2001 | Kaufman et al. |
| 6,182,162 | B1 | 1/2001 | Estakhari et al. |
| 6,199,122 | B1 | 3/2001 | Kobayashi |
| 6,219,439 | B1 | 4/2001 | Burger |
| 6,286,087 | B1 | 9/2001 | Ito et al. |
| 6,300,976 | B1 | 10/2001 | Fukuoka |
| 6,304,898 | B1 | 10/2001 | Shiigi |
| 6,324,537 | B1 | 11/2001 | Moran |
| 6,330,624 | B1 | 12/2001 | Cromer et al. |
| 6,330,648 | B1 | 12/2001 | Wambach et al. |
| 6,351,093 | B1 | 2/2002 | Kato et al. |
| 6,351,810 | B2 | 2/2002 | Gupta |
| 6,361,369 | B1 | 3/2002 | Kondo et al. |
| 6,370,603 | B1 | 4/2002 | Silverman et al. |
| 6,371,376 | B1 | 4/2002 | Dan |
| 6,385,667 | B1 | 5/2002 | Estakhri et al. |
| 6,385,677 | B1 | 5/2002 | Yao |
| 6,405,278 | B1* | 6/2002 | Liepe ........................ 711/103 |
| 6,446,118 | B1 | 9/2002 | Gottlieb |
| 6,457,099 | B1 | 9/2002 | Gilbert |
| 6,477,206 | B1 | 11/2002 | Chatani |
| 6,490,163 | B1 | 12/2002 | Pua et al. |
| 6,529,519 | B1* | 3/2003 | Steiner et al. ................ 370/412 |
| 6,577,337 | B1 | 6/2003 | Kang |
| 6,618,806 | B1 | 9/2003 | Brown et al. |
| 6,618,807 | B1 | 9/2003 | Wang et al. |
| 6,628,325 | B1 | 9/2003 | Steinberg et al. |
| 6,636,973 | B1 | 10/2003 | Novoa et al. |
| 6,671,808 | B1 | 12/2003 | Abbott et al. |
| 6,725,382 | B1 | 4/2004 | Thompson et al. |
| 6,732,278 | B2 | 5/2004 | Baird, III et al. |
| 6,748,541 | B1 | 6/2004 | Margalit et al. |
| 6,753,921 | B1 | 6/2004 | Shimizu |
| 6,763,182 | B1 | 7/2004 | Endo et al. |
| 6,763,399 | B2 | 7/2004 | Margalit et al. |
| 6,766,456 | B1 | 7/2004 | McKeeth |
| 6,786,417 | B1 | 9/2004 | Kondo et al. |
| 6,788,609 | B2* | 9/2004 | Yamagami et al. ...... 365/230.01 |
| 6,799,275 | B1 | 9/2004 | Bjorn |
| 6,829,672 | B1 | 12/2004 | Deng et al. |
| 6,848,045 | B2 | 1/2005 | Long et al. |
| 6,880,054 | B2 | 4/2005 | Cheng et al. |
| 6,970,183 | B1* | 11/2005 | Monroe ...................... 348/143 |
| 6,976,075 | B2* | 12/2005 | Ma ............................ 709/228 |
| 6,986,030 | B2 | 1/2006 | Shumueli et al. |
| 6,992,721 | B1 | 1/2006 | Kambayashi et al. |
| 7,036,738 | B1 | 5/2006 | Vanzini et al. |
| 7,039,759 | B2 | 5/2006 | Chent et al. |
| 7,111,324 | B2 | 9/2006 | Elteto |
| 2001/0009439 | A1 | 7/2001 | Hwang |
| 2001/0016845 | A1 | 8/2001 | Tribbensee |
| 2001/0029583 | A1 | 10/2001 | Palatov et al. |
| 2001/0030827 | A1 | 10/2001 | Morohashi |
| 2001/0047441 | A1 | 11/2001 | Robertson |
| 2001/0048409 | A1 | 12/2001 | Kim |
| 2001/0052541 | A1 | 12/2001 | Kang et al. |
| 2002/0010857 | A1 | 1/2002 | Karthik et al. |
| 2002/0029343 | A1 | 3/2002 | Kurita et al. |
| 2002/0065083 | A1* | 5/2002 | Patel ........................ 455/452 |
| 2002/0069237 | A1 | 6/2002 | Ehara |
| 2002/0073234 | A1* | 6/2002 | Ma ............................ 709/246 |
| 2002/0106933 | A1 | 8/2002 | Lee |
| 2002/0107046 | A1 | 8/2002 | Davis |
| 2002/0116565 | A1 | 8/2002 | Wang et al. |
| 2002/0131397 | A1* | 9/2002 | Patel et al. .................. 370/349 |
| 2002/0145507 | A1 | 10/2002 | Foster |
| 2002/0147882 | A1 | 10/2002 | Pua et al. |
| 2002/0151216 | A1 | 10/2002 | Wei |
| 2002/0167546 | A1 | 11/2002 | Kimbell et al. |
| 2002/0174287 | A1 | 11/2002 | Cheng |
| 2002/0174348 | A1 | 11/2002 | Ting |
| 2002/0194414 | A1 | 12/2002 | Bateman et al. |
| 2003/0063196 | A1 | 4/2003 | Palatov et al. |
| 2003/0103369 | A1 | 6/2003 | Wu |
| 2003/0110371 | A1 | 6/2003 | Yang et al. |
| 2003/0115415 | A1 | 6/2003 | Want et al. |
| 2003/0122839 | A1 | 7/2003 | Matraszek |
| 2003/0157959 | A1 | 8/2003 | Makela et al. |
| 2003/0163634 | A1 | 8/2003 | Kim |
| 2004/0025031 | A1 | 2/2004 | Ooi et al. |
| 2004/0049589 | A1* | 3/2004 | Papanikolaou et al. ...... 709/229 |
| 2004/0179588 | A1* | 9/2004 | Kuffner et al. .............. 375/224 |
| 2004/0236980 | A1 | 11/2004 | Chen |
| 2005/0235148 | A1 | 10/2005 | Scheidt et al. |
| 2006/0230202 | A1 | 10/2006 | Lee |

FOREIGN PATENT DOCUMENTS

| | | |
|---|---|---|
| CA | 2334113 | 10/2000 |

| | | | | | | |
|---|---|---|---|---|---|---|
| CN | 1291750 A | 4/2001 | | JP | 2001 216099 | 8/2001 |
| CN | 99117225.6 | 4/2001 | | JP | 2001 242965 A | 9/2001 |
| DE | 195 36 206 A1 | 4/1996 | | JP | 2001-249901 A | 9/2001 |
| DE | 196 45 937 A1 | 5/1998 | | JP | 2001 290753 A | 10/2001 |
| DE | 37 06 466 A | 9/1998 | | JP | 2001 344173 | 12/2001 |
| DE | 197 12 053 A1 | 9/1998 | | JP | 2001 346075 | 12/2001 |
| DE | 100 57697 A1 | 5/2002 | | JP | 2002-041247 A | 2/2002 |
| EP | 0 152 024 B1 | 8/1985 | | JP | 2002-092367 A | 3/2002 |
| EP | 0 674 290 B1 | 9/1995 | | JP | 2002-108823 A | 4/2002 |
| EP | 0 703 544 A | 3/1996 | | JP | 2002 157195 | 5/2002 |
| EP | 0 856 818 A2 | 5/1998 | | JP | 2002-185444 A | 6/2002 |
| EP | 0 856 818 A3 | 5/1998 | | JP | 2002-222022 A | 8/2002 |
| EP | 0 883 083 A1 | 9/1998 | | JP | 2002 232769 A | 8/2002 |
| EP | 0 883 084 A2 | 12/1998 | | JP | 2002 359763 A | 12/2002 |
| EP | 0 917 060 A1 | 5/1999 | | JP | 2003 186782 A | 7/2003 |
| EP | 0 923 018 A2 | 6/1999 | | JP | 2005-167965 A | 6/2005 |
| EP | 0 924 656 A2 | 6/1999 | | JP | 2006-030326 A | 2/2006 |
| EP | 0 924 657 A2 | 6/1999 | | KR | 1999-0018244 A | 3/1999 |
| EP | 0 929 043 A1 | 7/1999 | | KR | 1999-0062951 A | 7/1999 |
| EP | 0945777 A3 | 9/1999 | | KR | 2000-0009757 A | 2/2000 |
| EP | 1 006 479 A2 | 10/1999 | | KR | 10-2000-0054614 | 9/2000 |
| EP | 1 030 494 A1 | 8/2000 | | KR | 2000-0061817 A | 10/2000 |
| EP | 1 077 399 A2 | 2/2001 | | KR | 2001-0044238 A | 6/2001 |
| EP | 1 085 521 A1 | 3/2001 | | KR | 2001-0067730 A | 7/2001 |
| EP | 1 093 048 A2 | 4/2001 | | KR | 2001-0074291 A | 8/2001 |
| EP | 1 100 000 A2 | 5/2001 | | KR | 2001-0097886 A | 11/2001 |
| EP | 0 912 939 B1 | 9/2001 | | KR | 2002-0014193 A | 2/2002 |
| EP | 1 146 559 A1 | 10/2001 | | KR | 2002 085497 A | 11/2002 |
| EP | 1139224 A2 | 10/2001 | | NZ | 329369 | 10/1997 |
| EP | 1 152 324 A2 | 11/2001 | | TW | 431101 | 4/2001 |
| EP | 1 156 697 A1 | 11/2001 | | TW | 439377 | 6/2001 |
| EP | 1 158 763 A2 | 11/2001 | | TW | 446851 | 7/2001 |
| EP | 1 215 876 A1 | 6/2002 | | TW | 453071 | 9/2001 |
| EP | 1 215 877 A2 | 6/2002 | | WO | WO 87/07063 | 11/1987 |
| EP | 1 215 877 A3 | 6/2002 | | WO | WO 89/12287 A | 12/1989 |
| EP | 1 146 559 B1 | 3/2006 | | WO | WO 94/12938 A1 | 6/1994 |
| GB | 2 197 734 A | 5/1988 | | WO | WO 95/16238 A1 | 6/1995 |
| GB | 2 204 971 A | 11/1988 | | WO | 97/34252 A1 | 9/1997 |
| GB | 2 312 040 A | 10/1997 | | WO | WO 97/39549 A2 | 10/1997 |
| GB | 2 354 612 A | 3/2001 | | WO | WO 98/07255 | 2/1998 |
| GB | 2 361 558 A | 10/2001 | | WO | WO 98/12670 | 3/1998 |
| JP | 64-048151 A | 2/1989 | | WO | WO 98/13791 A | 4/1998 |
| JP | 08-263631 A | 10/1996 | | WO | WO 98/38567 | 9/1998 |
| JP | 09-069969 A | 3/1997 | | WO | WO 98/38567 A1 | 9/1998 |
| JP | 9069067 | 3/1997 | | WO | WO 99/08238 | 2/1999 |
| JP | 9-297844 A | 11/1997 | | WO | WO 99/13434 A1 | 3/1999 |
| JP | 10-003532 A | 1/1998 | | WO | WO 99/16024 A1 | 4/1999 |
| JP | 10-269145 A | 10/1998 | | WO | WO 99/56429 A1 | 4/1999 |
| JP | 10-283292 A | 10/1998 | | WO | 99/28701 A1 | 6/1999 |
| JP | 11-053060 A | 2/1999 | | WO | WO 99/40723 | 8/1999 |
| JP | 11-143760 A | 5/1999 | | WO | WO 99/45460 | 9/1999 |
| JP | 11-184992 A | 7/1999 | | WO | 99/52236 A1 | 10/1999 |
| JP | 11-265324 A | 9/1999 | | WO | 99/56236 A1 | 11/1999 |
| JP | 11266384 A | 9/1999 | | WO | 99/60786 A1 | 11/1999 |
| JP | 2000 048177 | 2/2000 | | WO | WO 99/63476 | 12/1999 |
| JP | 2000-181963 A | 6/2000 | | WO | WO 99/63476 A1 | 12/1999 |
| JP | 2000 200123 | 7/2000 | | WO | WO 00/03316 A1 | 1/2000 |
| JP | 2000 200248 | 7/2000 | | WO | WO 00/07387 | 2/2000 |
| JP | 2000-207835 A | 7/2000 | | WO | WO 00/14987 A1 | 3/2000 |
| JP | 2000 209534 A | 7/2000 | | WO | 00/22774 A1 | 4/2000 |
| JP | 2000-231558 A | 8/2000 | | WO | WO 00/19294 A2 | 4/2000 |
| JP | 2000-244796 A | 9/2000 | | WO | 00/28539 A1 | 5/2000 |
| JP | 2001-249693 A | 9/2000 | | WO | WO 00/28471 | 5/2000 |
| JP | 2000 307911 | 11/2000 | | WO | WO 00/28471 A1 | 5/2000 |
| JP | 2000-331166 A | 11/2000 | | WO | WO 00/42491 | 7/2000 |
| JP | 2000-350174 A | 12/2000 | | WO | 00/45696 A1 | 8/2000 |
| JP | 2001-059701 A | 3/2001 | | WO | 00/48135 A1 | 8/2000 |
| JP | 2001-069260 A | 3/2001 | | WO | WO 00/55707 A1 | 9/2000 |
| JP | 2001-069390 A | 3/2001 | | WO | WO 00/60476 | 10/2000 |
| JP | 2001-118046 A | 4/2001 | | WO | WO 00/67098 A1 | 11/2000 |
| JP | 2001-128113 A | 5/2001 | | WO | 01/06786 A1 | 1/2001 |
| JP | 2001-143052 A | 5/2001 | | WO | WO 01/08055 A1 | 2/2001 |
| JP | 2001-338358 A | 7/2001 | | WO | WO 01/09845 A1 | 2/2001 |

| | | |
|---|---|---|
| WO | WO 01/16917 A2 | 3/2001 |
| WO | WO 01/22351 | 3/2001 |
| WO | WO 01/23987 | 4/2001 |
| WO | WO 01/31577 A1 | 5/2001 |
| WO | WO 01/33317 A1 | 5/2001 |
| WO | WO 01/48612 A1 | 7/2001 |
| WO | WO 01/61692 A | 8/2001 |
| WO | WO 01/73570 A | 10/2001 |
| WO | WO 01/86640 A2 | 11/2001 |
| WO | WO 01/86640 A3 | 11/2001 |

OTHER PUBLICATIONS

Lexar JumpShot Cable; date unknown.
PCMCIA SRAM & Linear Flash Cards; C1-Tech, Simple Technology, Centennial, Intel, KingMax; date unknown; retrieved from the internet URL:http://www.psism.com/sram.htm ; 5 pages.
Pretec PCMCIA Type I SRAM 2048 KB; date unknown; retrieved from the internet URL:http://www.everythinglinux.com.../SRAM2M?elinux=e0c72135e544a6ea13772f5c23ba3f0 ; 1 page.
What is Memory Stick?; date unknown; retrieved from the internet URL:http://www.memorystick.org/topic/eng/aboutms/feat_outline.html ; 1 page.
Rajesh Gupta; Yervant Zorian; Introducing Core-Based System Design; IEEE; 1997; pp. 15-25.
CY7C63000, CY7C63001, CY7C63100, CY7C63101, CY7C63200, CY7C63201 Universal Serial Bus Microcontroller; Cypress; Jun. 26, 1997; 27 pages.
PC/104 PCMCIA Module, 1st Edition, Part No. 2007311000 Manual; Printed in Taiwan; Jul. 1997.
IBM Smart Card Solution Elements; IBM; Jul. 1997; pp. 1-24.
Interfacing the Intel Flash 28F001BX-T to Your 186 Based System; Intel; 1998; retrieved from the internet URL:http://developer.intel.com/design/intarch/applnots/2150.htm 14 pages.
SY-6IEB Main Board Quick Start Guide; SOYO Computer Inc.; Sep. 1998; pp. 3-14.
Universal Serial Bus Specification Revision 1.1; Compaq, Intel, Microsoft, NEC; Sep. 23, 1998.
Week of Oct, 19, 1998; Multimedia Work; Oct. 23, 1998; retrieved from internet URL:http://www.m2w.net/News/981019.html; 10 pages.
Understanding the Flash Translation Layer (FTL) Specification; Intel; Dec. 1998.
SanDisk ImageMate USB Review ; Digital Eyes; copyright 1998-2001; retrieved from internet URL:http://www.image-acquire.com/articles/storage/sdimagematesub.shtml ; 2 pages.
Tony K.P. Wong; An Embedded Chip for USB Application: from the Architecture to Implementation; International IC' 99 Conference Proceedings; Siemens; 1999; 10 pages.
AlphaPC 164LX Motherboard Product Brief; Alphaprocessor, Inc.; Jan. 1999; 2 pages.
Image Memory Card Reader SM-R1 Owner's Manual; FujiFilm; Apr. 1, 1999.
SanDisk ImageMate USB CF Card Reader; Feather River Canyon News; Jul. 12, 1999; retrieved from the internet URL:http://www.quicknet.com/~frcn/SanDiskUSB.html; 3 pages.
Jeff Keller; DCRP Review: Fujifilm MX-2900; Digital Camera Resource Page; Jul. 27, 1999; retrieved from the internet URL:http://www.dcresource.com/reviews/fuji/mx2900-review/ ; 9 pages.
Matsushita Electric, Scandisk and Toshiba Agree Join Forces to Develop and Promote Next Generation Secure Memory Card; SD Card Association; Aug. 25, 1999; retrieved from internet URL:http://www.sdcard.org/press5.htm; 4 pages.
(BW) (CA—Rainbow—Technologies) (RNBO) Rainbow Technologies Forms New Joint Venture in China; Business Wire; Nov. 8, 1999; retrieved from the internet URL:http://www.businesswire.com/webbox/bw.110899/193120188.htm ; 2 pages.
Fuji Film SM-R1 Memory Card Reader; TwoMobile; Dec. 1999; retrieved from internet URL:http://www.twomobile.com/rev_smr1reader.html ; 3 pages.
Boot sequence [online]; Jan. 16, 2001; retrieved from the internet: URL:http://web.archive.org/web/20010116104400/www.pcguide.com/ref/mbsys/bios/set/adv_Boot.htm.

T. Fukagawa and M. Nagayama, "2001 edition of Hints on Use of PC—Release of Convincing Techniques and Useful Approaches to Using PC," Touch PC, Mainichi Communications, Inc., Mar. 24, 2001, vol. 6, No. 3, pp. 20-21.
SL11R USB Controller/16-Bit RISC Processor Data Sheet; Cypress Semiconductor Corporation; Dec. 3, 2001; 85 pages.
USB Support for Amibios8 [online]; American Megatrends; Oct. 16, 2002; retrieved from the internet: URL:http://www.ami.com/support/downloaddoc.cfm?DLFile=support/doc/AMIBIOS8_USB_Whitepaper.pdf&FileID=513 ; 12 pages.
SSFDC Forum; SSFDC Forum; Dec. 27, 2002; retrieved from internet URL:http://www.ssfdc.or.jp/english/; 1 page.
Mainboard D1307. Datasheet [online]; Fujitsu Siemens Computer, Mar. 2003; retrieved from the internet: URL:www.fujitsu-siemens.com.pl/_itemserver/dok_mainboard/datasheet_d1307.pdf ; 2 pages.
Concept of SPB-Linux-2 [online]; Mar. 24, 2003; retrieved from the internet: URL:http:web.archive.org/web/20030324012428/http://www.8ung.at/spblinux/concept.htm ; 3 pages.
Reference Design: SL11RIDE-Combo; Cypress; Jul. 10, 2003; retrieved from internet; 2 pages.
Availability of Universal Serial Bus Support in Windows 95; Oct. 7, 2003; retrieved from the internet URL:http://support.microsoft.com/default.aspx?scid=kb;en-us:253756 ; 3 pages.
U.S. Appl. No. 09/449,159, Abbott et al.
Aladdin Knowledge Systems, Inc.; MacHUSP USB; (advertising material); pp. 29-38.
Rogers, Sue; Techlink Seminar 3 New Mac Hardware and Peripherals; Nov. 19, 1999.
Universal Serial Bus Mass Storage Class Specification Overview; V 1.0 Revision; Oct. 22, 1998.
Universal Serial Bus Mass Storage Class / UFI Command Specification; Revision 1.0; Dec. 14, 1998.
Ziller, Jason and Fair, David; Which External I/O Bus Is Right For You?; Intel Corporation; Intel Developer Update Magazine; Jan. 2000.
USBDrive Professional; www.usbdrive.com, 1998-2003.
Trek's Thumb Drive Debuts at CeBit; The Business Times; Feb. 28, 2000.
A Widget Makes a Bright Debut, article in "Shenzhen Special Zone Daily," Oct. 9, 1999.
Affidavit of Cheng Xiaohua of Netac Technology Co. Ltd., China; submitted to the High Court of the Republic of Singapore in Suit No. S672/2002/S; Jun. 3, 2003.
Aladdin Announces eToken—Next Generation Security Key Based on Universal Bus Port San Jose, RSA Data Security Conference, Aladdin booth#238 Jan. 19, 1999 <Web document retrieved at http://www.aladdin.com/news/1999/etoken/etoken.asp>.
Claims filed by the applicant of EP 1234305 on Oct. 10, 2006.
Decision by the EPO to refuse EP publication No. 1234305 dated Feb. 1, 2007.
Decision issued by The UK Patent Office in Application under Section 72 for revocation of patent No. GB 2371653 dated Nov. 8, 2006.
Grounds of Decision issued in Civil Appeals Nos. 69 and 70 of 2005 in the Court of Appeals of the Republic of Singapore, Dec. 30, 2005.
JBMail, article, Dec. 2001, "PC Tip Magazine." Switzerland.
Minutes of Oral Proceedings held in EPO on Nov. 9, 2006, for EP Publication No. 1 234 305 issued on Feb. 1, 2007.
PocoMail PE v.2.63; Web Site Publication; Web Site States Released Feb. 2002, http://poco.ca/press.html.
Shenzhen Netac Technology Co., Ltd publication "Very Small" floppy disk-Only Disk, Oct. 4, 1999.
Statutory Declaration of Cheng Xiaohua of Netac Technology Co. Ltd., China; executed under oath in Singapore; Sep. 8, 2003.
Toshiba: Press Release Nov. 12, 2001 "Toshiba and Sandisk Introduce a One Gigabit NAND Flash Memory Chip, Doubling Capacity of Future Flash Products," Published Nov. 12, 2001, pp. 1-3.
Toshiba: Press Release Sep. 26, 2000 "Toshiba Introduces 512M bit and 1G bit NAND Flash Memories," Published Sep. 26, 2000, pp. 1-2.
Wibu-Key User's Guide for Windows, DOS, OS/2 and MacOS on IBM compatible PCs and Macintosh Version 2.5, Published Jul. 1998, pp. 11 to 16 and 25 to 27.

"Trek 2000 International Launches Revolutionary 'Thumb Drive' AT CeBIT 2000; Revolutionary New Device a Cableless, 'Plug-and-play' Solution to Personal, On-the-Go Memory Storage," Business Wire, Feb. 25, 2000, Singapore.

BioLogon 2.0 for VVindows 2000 User's Guide, Aug. 2000, Identix Incorporated.

Zero One, vol. 53, pp. 79-86, published by Nikkei Home Publishing Company, Oct. 1, 2001.

Computermuseum, review of desktop computers, downloaded from http://www.case.hu-berlin.de/cm/einzelAnsicht?kat=Desktops&lang=eng.

IBM personal computer, model 5150, downloaded from http://oldcomputers.net/ibm5150.html.

W32.Gibe@mm, a virus discovered Mar. 4, 2002, downloaded from http://www.symantec.com/security_response/print_writeup.jsp?docid=2002-030413-4714-99.

Aladdin Announces eToken "Next Generation Security Key Based on Universal Bus Port" San Jose, RSA Data Security Conference, Aladdin booth#238, Jan. 19, 1999 ,<Web document retrieved at http://www.aladdin.com/news/1999/etoken/etoken.asp>.

PocoMail PE v.2.63, Web Site Publication, Web Site states released Feb. 2002, http://poco.ca/press.html.

* cited by examiner

METHOD AND DEVICES FOR DATA TRANSFER

The present invention relates to methods and apparatus for wireless transfer of data between a computer and one or more electronic devices external to the computer but which can usefully communicate data to and/or from the computer. Examples of such an electronic device include a camera, a video camera, a organiser, an MP3 player, or a PDA (personal assistant). Such external electronic devices are frequently termed "slave devices".

There is an increasing demand for portable devices which combine high power with small size and lightness. Although modem processors can be miniaturised while retaining their ability to handle large volumes of data, the size of the portable devices limits their memory capacity. Users who require a larger memory capacity presently have to transfer the data to a separate memory medium, such as a compact flash card, a multimedia card, a memory stick, smart media, etc, having a physical connection to the portable device. Since a vast array of storage media may be used, compatibility is a serious issue. It may be particularly difficult to keep an existing computer system up-to-date and fully compatible when new portable devices are added to it.

The present invention seeks to provide new and useful methods and apparatus for transferring data between electronic devices, and in particular to facilitate communication between a computer device and one or more external portable electronic devices, and/or between those external devices.

In general terms the invention proposes that a data storage apparatus includes a wireless transceiver for selectively entering communication with a computer device or one of the external electronic devices. When the storage apparatus is communicating with any of the devices, it can transmit to that device any data stored in its memory for transmission to that device. Furthermore, the storage apparatus can receive from that device, and transmit to its memory, data to be relayed to another of the devices.

The storage apparatus may thus "bridge" the gap between the external devices and the computer device. Since the storage apparatus is substantially devoted to storage of data, it can accommodate a memory which is larger than in most other portable electronic items, for example a memory of at least 1 GB, at least 10 GB or at least 20 GB. The memory of the storage apparatus can be, for example, a magnetic disk drive or any other suitable non-volatile memory device, such as an electrically erasable programmable read only memory (EE-PROM), a ferroelectric random access memory (FRAM), a magetoresistive random access memory (MRAM), or any other memory device which may become available in the future.

The wireless transceiver preferably operates by electromagnetic waves, and most preferably by RF or infra-red waves. In the former case, the transceiver may consist of an aerial and RF interface circuitry. Irrespective of the wireless waves employed, the transceiver may use any protocol presently in existence or which may become available in the future, for example it may be capable of sending and/or receiving signals in at least one of (i) IEEE802.11, (ii) Bluetooth, or (iii) irDA.

It is also possible that the storage apparatus may be capable of receiving/transmitting in multiple formats, so that it can interpret between two slave devices which use different formats.

Preferably, any external unit which includes an internal memory is arranged, upon that internal memory becoming full, or at least the amount of data passing a predefined limit, to initiate communication with the data storage apparatus, so that the data can be transferred to the data storage apparatus.

Preferably all communications carried out by the data storage apparatus include a process of establishing the identify of the other device (computer device or slave device) using an ID code received from that device and compared with list of ID codes stored internally by the data storage device.

Specifically, a first expression of the invention is a method of transferring data within a system including a computer device, a transfer apparatus and one or more external devices, each of the computer device and external devices including wireless communication means, and the transfer apparatus comprising a processor, a memory and wireless transceiver means, the method including the steps of:

a first one of the devices transmitting a wireless signal to the transceiver means including data for transmission to a second one of the devices, the processor storing the data in the memory, and the processor using the transceiver means to transmit the data to the second device.

A second expression of the invention is a data transfer apparatus for a system comprising a computer device and one or more external electronic devices, each of the computer device and external devices including wireless communication means, the apparatus comprising:

wireless transceiver means for receiving and transmitting wireless signals;

a processor; and a memory;

the processor being arranged, upon receipt by the transceiver means of a wireless signal from a first one of the devices containing data for relay to a second one of the devices, to store that signal in the memory, and, upon subsequently establishing communication with the second device, to transmit the data to the second device.

Further preferred features of the invention will now be described for the sake of example only with reference to the following figures, in which.

Figure 1:
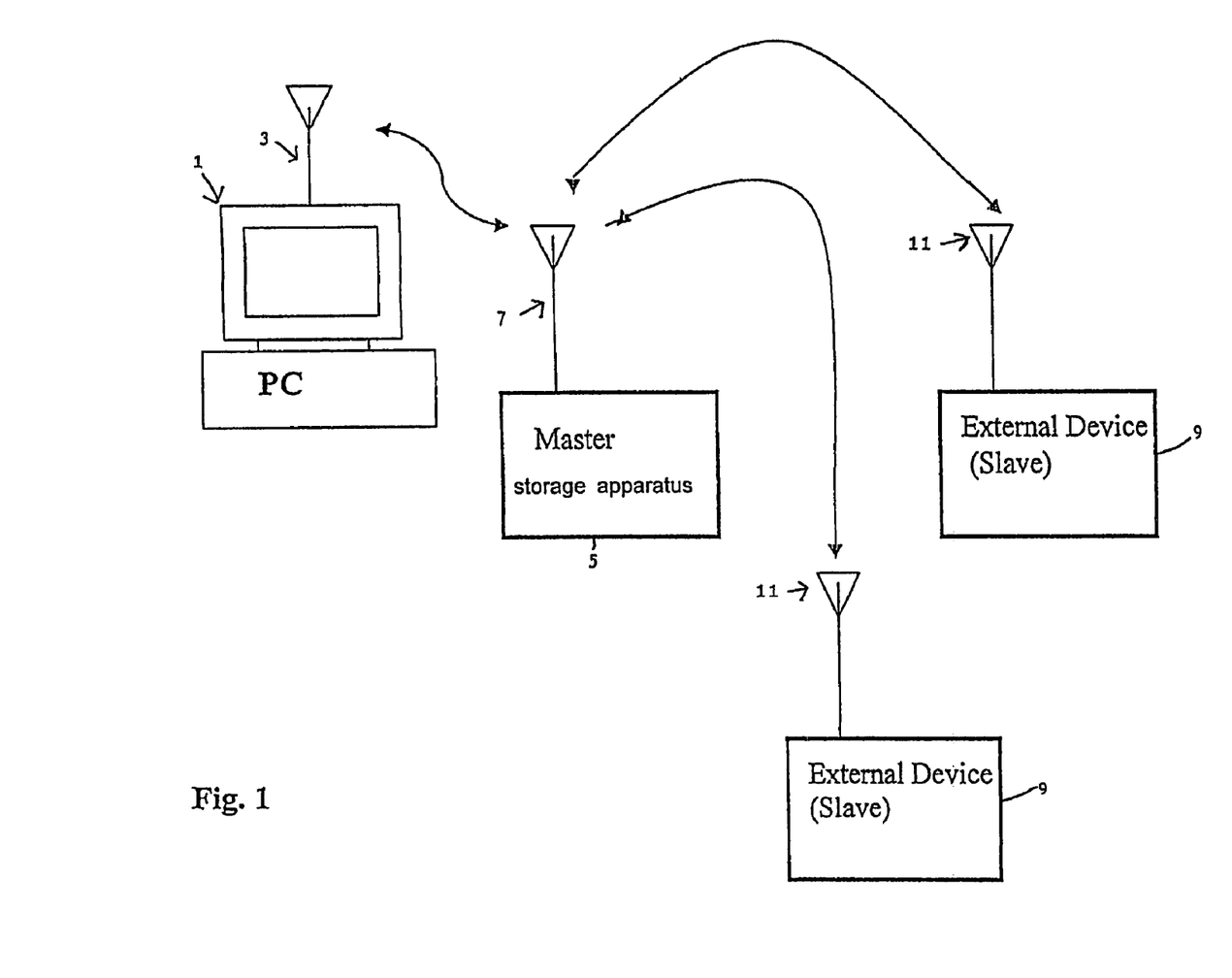
FIG. 1 shows a system including a master storage apparatus according to the invention, a PC and a plurality of slave devices.

Referring to FIG. 1, a system embodying the invention includes a PC 1 having an aerial 3. The system also includes a master storage apparatus 5, having an aerial 7. The system further includes a plurality of electronic ("slave") devices 9 which are external to the computer device 1 and spatially separated from it, but which may usefully communicate data to and/or from the PC 1. Each external device 9 has an aerial 11. For simplicity only two slave devices 9 are illustrated in FIG. 1. The master storage apparatus 5 and each of the external devices 9 are portable. For example, their weight is preferably less than 1 kilogram each, and each preferably includes an internal power source such as a battery.

The PC 1 and the master storage apparatus 5 can communicate using the aerials 3, 7. Similarly, the master storage apparatus 5 and the external devices 9 can communicate using the aerials 7, 11. Both forms of communication may be using any of the communication protocols IEEE802.11, Bluetooth, irDA, etc. As described below, any of the slave devices 9 can send data selectively to the PC 1 or to any of the other slave devices 9 via the master storage apparatus 5. The PC 1 can send data to a selected one of the slave devices 9 via the master storage apparatus. All of this communication is digital, and the storage module 30 is for digital data. In addition, it is possible that the data may be sent in an encrypted form.

Note that at least one (and possibly all) of the slave devices 9 may not require two-way communication with other slave devices 9 or the PC 1. For example, in the case of a slave device 9 which is a digital camera, the data transmitted via the master storage device 5 may largely (or exclusively) be from the digital camera to the PC 1.

Figure 2:
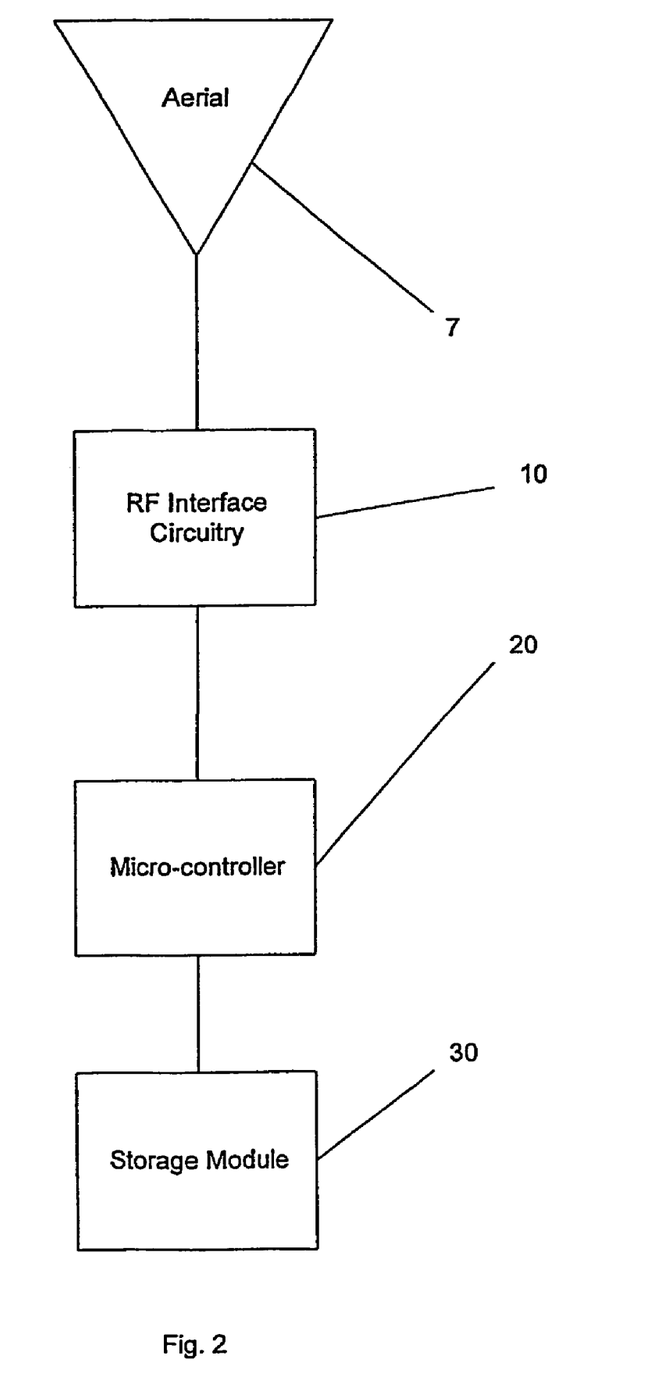
FIG. 2 shows the structure of the master storage apparatus of FIG. 1.

Turning to FIG. 2, the master storage apparatus 5 includes an aerial 7, RF interface circuitry 10, a micro-controller 20 (e.g. a microprocessor), and a storage module (memory) 30. Upon receipt of a signal by the aerial 7, it is processed by the RF interface circuitry 10, and transmitted to the micro-controller 20. The micro-controller 20 controls writing of data to the storage module 30, and reading of data from the storage module 30. It can further control the RF interface circuitry 10 to cause a signal to be transmitted using the aerial 7.

Some (usually all) of the external devices 9 include an internal memory having a capacity less than that of the storage module 30. For example, the storage capacity of each of the internal memories of the external devices 9 may be at most one tenth of that of the storage module 30. In the case that one of the external devices 9 accumulates an amount of data which threatens to surpass the capacity of the internal memory of the slave device 9, the slave device 9 emits a "write request" signal to the master storage apparatus 5, requesting that communication is established between that slave device 9 and the master storage apparatus 5 so that data can be transferred to the storage module 30.

Figure 3:
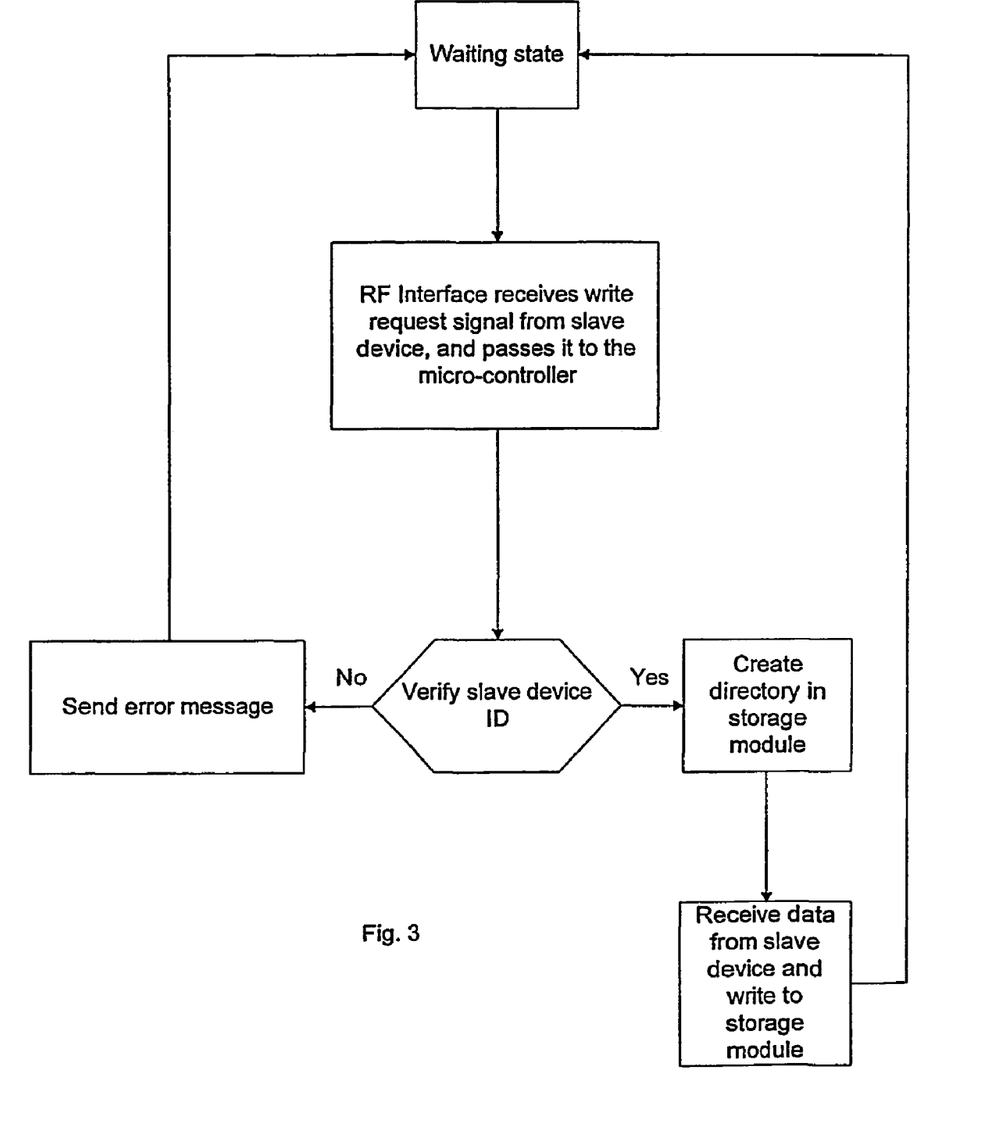
FIG. 3 is a flow diagram of the operation of the master storage apparatus of FIG. 1 in the case that a write request signal is received from a slave device.

FIG. 3 is a flow diagram of the operation of the master storage apparatus 5 in the case that the master storage apparatus 5 receives a "write request" signal from a slave device 9 indicating that it has data to be written into the storage module 30. Beginning at the top of the FIG. 3, the master storage apparatus 5 is initially in a "waiting state", in which the RF Interface Circuitry 10 is sensitive to signals, and the master storage apparatus 5 is also sensitive to other commands, such as keystrokes on a keypad of the storage apparatus.

When the aerial 7 receives a write request signal from the external device 9, the RF Interface circuitry 10 receives it, and sends it to the micro-controller 20. The micro-controller 20 recognises the received signal as a write request signal emanating from the slave device 9, indicating that the slave device 9 wishes to write data to the storage module 30. The micro-controller 20 examines the write request signal to determine whether a slave ID contained in the signal corresponds to one of a predetermined list of ID signals. If it does not, then the master storage apparatus 5 generates an error message. For example, this may be an error message on a screen. Alternatively or additionally, it may be a radio message transmitted from the master storage apparatus 5, for example for recognition by the slave device 9 which sent the write signal. Alternatively, if the ID contained in the write request signal corresponds to one of the predetermined list of IDs, then the micro-controller 20 has established the identity of the slave device 9. In this case the micro-controller 20 creates a directory in the storage module 30 associated with the slave device 9, establishes a communication link to that slave device 9 to read data from it, and writes that data into the directory for that slave device. The master storage apparatus 5 then returns to the waiting state.

Figure 4:
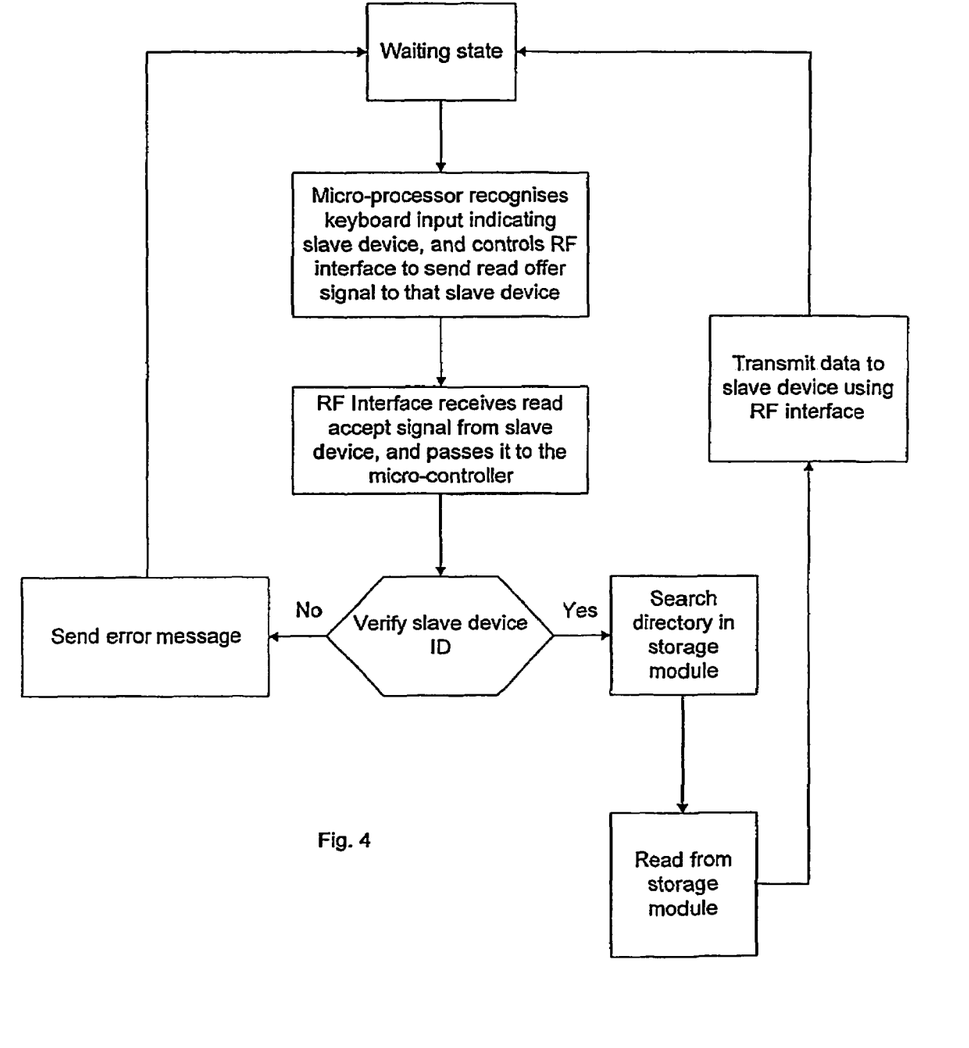
FIG. 4 shows the operation of the master storage apparatus of FIG. 1 transmitting data to a slave device.

Turning to FIG. 4, the process is illustrated in which a master storage apparatus 5 sends data to a slave device 9. As in FIG. 3, the master storage apparatus 5 is initially in a waiting state. A user keys in a command to transit data to one of the slave devices 9 using a keypad on the master storage apparatus 5, and this ID is sent to the micro-controller. The micro-controller 20 instructs the RF interface to send a "read offer" signal using the aerial 7 to the indicated slave device 9, which may respond by transmitting back to the RF interface an "read accept" signal including its ID code. The micro-controller 20 compares the ID code with a predetermined list of ID signals, thereby confirming the identity of the slave device 9. If the identity of the slave device 9 cannot be determined, the master storage apparatus 5 generates an error message and returns to the waiting state. Alternatively, if the identity of the slave device 9 has been determined, then the micro-controller 20 searches the storage module 30 and extracts data stored there for transmission to that slave device 9. The micro-controller 20 then controls the RF Interface Circuitry 10 to broadcast the data to the slave device 9.

Figure 5:
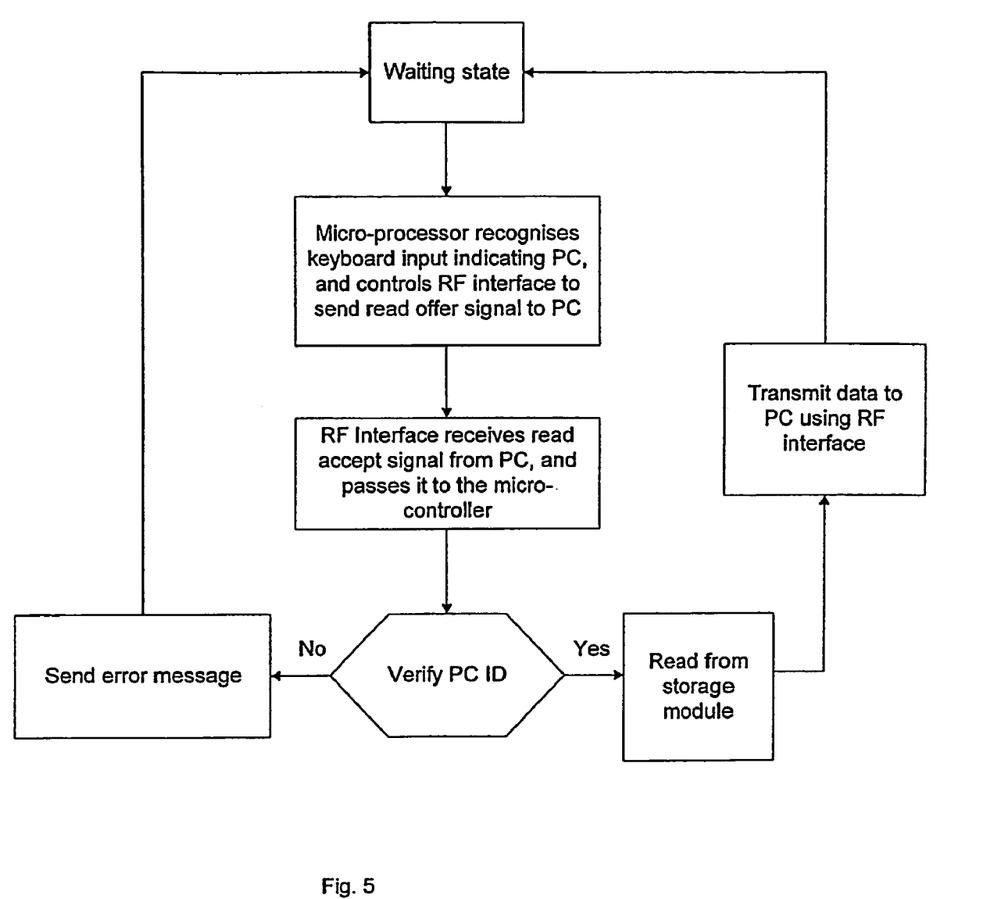
FIG. 5 shows the operation of the master storage apparatus of FIG. 1 transmitting data to the PC.

Turning to FIG. 5, a flow diagram of the operation of the master storage apparatus 5 is shown in the case of writing data to the PC 1. As in FIG. 3 and FIG. 4, the initial state of the master storage apparatus 5, at the top of FIG. 5 is a waiting state. Upon a command being keyed into the master storage device 5, the micro-controller 20 instructs the RF interface 10 to send a "read offer" signal to the PC 1, indicating that the master storage device 5 wishes to transmit data to the PC 1. If the PC 1 is able to accept the data, the PC 1 generates a "read accept" signal including the ID of the PC. The signal is received by the aerial 7 and sent by the RF Interface Circuitry 10 to the micro-controller 20. The micro-controller 20 compares the ID with a copy in its own memory. If the comparison is incorrect, the master storage apparatus 5 generates an error message, such as by controlling the RF Interface Circuitry 10 to broadcast an error message to the PC 1. Alternatively, if the ID of the PC 5 is recognised, the micro-controller 10 accesses the storage module 30, and controls the RF Interface Circuitry 10 to broadcast all of the data in the storage module 30 which is to be relayed to the PC 1. The PC 1 can read directory on master storage device 5 and select some or all of the files from the device 5.

The process of writing data from the PC 1 to the master storage device 5 is broadly similar to that described above in relation to FIG. 3. The PC 1 sends a write request signal to the master storage device 5 containing an ID code for the PC 1. The master storage device 5 verifies the identity of the PC 1 by comparing the code with an internal record of the ID code for the PC 1 (if the two do not match an error message is sent). The master storage device 5 then enters communication with the PC 1 in which data is sent to the master storage device 5 and transmitted to the storage module 30.

Although the invention has been explained above with reference to only a single embodiment, many variations are possible within the scope of the invention as will be clear to a skilled person.

For example, the master storage apparatus 5 may be capable of communicating in multiple communication protocols (standards), according to which protocol(s) are acceptable to the device with which it is communicating at any moment. For example, if the PC 1 requires communication in a first protocol, one or more of the slave devices 9 require communication in a second protocol, and one or more other of the slave devices 9 require communication in a third protocol, the master storage apparatus 5 may be capable of communication in any of these protocols. As described above, the process of establishing communication with the PC 1 or any of the slave devices 9 includes establishing the identity of the PC 1 or that slave device 9, and the master storage apparatus may use this identity to determine the protocol which should be used. For example, the master storage apparatus 5 may include a look-up table of communication protocols appropriate for each of its possible communication partners, and, having established the identity of the PC 1 or slave device 9 with which it is presently communicating, the master storage apparatus may access the look-up table to determine the corresponding communication protocol. That communication protocol may then be used to control the operation of the RF Interface circuitry 10.

Furthermore, although the mode of wireless communication used in the embodiment is radio communication, the communication may alternatively be conducted by any other form of communication which does not employ wires (or other cables), such as infra-red signalling or microwave signalling. It may even employ ultrasound signalling. In the case that the PC and the external devices do not all employ the same wireless communication mode (e.g. the PC may use RF communication, while one or more of the external devices may use infra-red signals, and one of more others use microwave signalling), the master storage apparatus of the invention may be provided with multiple transceiver means, each for a respective wireless communication mode.

The invention claimed is:

1. A method of transferring data within a system including a plurality of devices that includes a computing device, a data transfer apparatus, and one or more external devices, each of the computing device and the one or more external devices including wireless communication means, and the data transfer apparatus comprising a processor, a non-volatile memory, and wireless transceiver means, the method comprising:
   transmitting a first wireless signal from a first external device to the wireless transceiver means of the data transfer apparatus, the first wireless signal including first data for transmission to one of the plurality of devices,
   storing by the processor the first data in the non-volatile memory of the data transfer apparatus such that the first data is associated with the first external device,
   transmitting a second wireless signal from a second external device to the wireless transceiver means of the data transfer apparatus, the second wireless signal including second data for transmission to one of the plurality of devices;
   storing by the processor the second data in the non-volatile memory of the data transfer apparatus such that the second data is associated with the second external device; and
   wirelessly transmitting the first data to one of the plurality of devices by the wireless transceiver means of the data transfer apparatus.

2. The method according to claim 1 wherein the one of the plurality of devices is the computing device.

3. The method according to claim 2 further comprising establishing communication by the first external devices with the data transfer apparatus upon determining that an internal memory of the first external devices contains a predetermined amount of data.

4. The method according to claim 2 further comprising establishing communication between the data transfer apparatus and the first external devices, including transmitting an ID code to the data transfer apparatus by the first external device, wherein the data transfer apparatus uses the ID code to verify the identity of the first external device.

5. The method according to claim 4 further comprising establishing communication between the data transfer apparatus and the one of the plurality of devices, including transmitting an ID code to the data transfer apparatus by the one of the plurality of devices, wherein the data transfer apparatus uses the ID code to verify the identity of the one of the plurality of devices.

6. The method according to claim 2 further comprising establishing communication between the data transfer apparatus and the computing device, including transmitting an ID code to the data transfer apparatus by the computing device, wherein the data transfer apparatus uses the ID code to verify the identity of the computing device.

7. The method according to claim 1 wherein the one of the plurality of devices is one of the one or more external devices.

8. The method according to claim 7 further comprising establishing communication between the data transfer apparatus and the first external device, including transmitting an ID code to the data transfer apparatus by the first external device, wherein the data transfer apparatus uses the ID code to verify the identity of the first external device.

9. The method according to claim 8 further comprising establishing communication between the data transfer apparatus and the one of the plurality of devices, including transmitting an ID code to the data transfer apparatus by the one of the plurality of devices, wherein the data transfer apparatus uses the ID code to verify the identity of the one of the plurality of devices.

10. The method according to claim 7 further comprising establishing communication between the data transfer apparatus and one of the external devices, including transmitting an ID code to the data transfer apparatus by the external device, wherein the data transfer apparatus uses the ID code to verify the identity of the external device.

11. The method according to claim 1, further comprising establishing communication between the data transfer apparatus and the first external devices, including transmitting an ID code to the data transfer apparatus by the first external device, wherein the data transfer apparatus uses the ID code to verify the identity of the first external device.

12. The method according to claim 11 further comprising establishing communication between the data transfer apparatus and the one of the plurality of devices, including transmitting an ID code to the data transfer apparatus by the one of the plurality of devices, wherein the data transfer apparatus uses the ID code to verify the identity of the one of the plurality of devices.

13. The method according to claim 1, further comprising establishing communication between the data transfer apparatus and the one of the plurality of devices, including transmitting an ID code to the data transfer apparatus by the one of the plurality of devices, wherein the data transfer apparatus uses the ID code to verify the identity of the one of the plurality of devices.

14. A system comprising:
   a computing device;
   one or more external devices, each of the computing device and the one or more external devices including wireless communication means; and
   a data transfer apparatus comprising:
      wireless transceiver means for receiving and transmitting wireless signals;
      a processor; and
      a non-volatile memory;

the processor being arranged, upon receipt by the wireless transceiver means of a wireless signal from a first external device containing first data for relay to another device in the system, to store at least a portion of the first data in the non-volatile memory such that the portion of the first data is associated with the first external device, and upon receipt by the wireless transceiver means of a second wireless signal from a second external device containing second data for relay to another device in the system, to store at least a portion of the second data in the non-volatile memory such that the portion of the second data is associated with the second external device, and, upon subsequently establishing communication with the other device in the system, to cause the wireless transceiver means to wirelessly transmit the stored portion of the first data to the other device.

15. The system according to claim 14, wherein at least one of the one or more external devices includes an internal memory and is arranged to initiate communication with the data transfer apparatus to transmit the wireless signal to the data transfer apparatus, upon the amount of data stored in the internal memory reaching or approaching the capacity of the internal memory.

16. A data transfer apparatus comprising:
a wireless transceiver capable of receiving and transmitting wireless signals from and to a first device, a second device, and a third device, the first device including a memory having a first memory capacity and a wireless transceiver and the second device including a memory having a second memory capacity and a wireless transceiver;
a processor; and
a non-volatile memory having a third memory capacity, wherein the third memory capacity is substantially greater than the first memory capacity;
wherein the processor is capable of, upon receipt by the wireless transceiver of a wireless signal from the first device containing first data for relay to the second device, storing at least a portion of the first data in the non-volatile memory such that the portion of the first data is associated with the first device, and, upon receipt by the wireless transceiver of a wireless signal from the third device containing third data for relay to the second device, storing at least a portion of the third data in the non-volatile memory such that the portion of the third data is associated with the third device, and, upon subsequently establishing communication with the second device, wirelessly transmitting the stored portion of the first data to the second device.

17. The data transfer apparatus according to claim 16, wherein the second device is a computer.

18. A data transfer apparatus according to claim 16, wherein the first device is a portable device.

19. A data transfer apparatus according to claim 16, wherein the second device is a portable device.

* * * * *